Sept. 27, 1966    E. L. KILBOURN    3,274,677

METHOD OF MAKING LEVER ARMS

Filed April 24, 1963

INVENTOR.
EUGENE L. KILBOURN
BY
Woodhams, Blanchard & Flynn
ATTORNEYS

# United States Patent Office 3,274,677
Patented Sept. 27, 1966

3,274,677
METHOD OF MAKING LEVER ARMS
Eugene L. Kilbourn, Marengo Township, Calhoun County, Mich., assignor to S. H. Leggitt Company, Marshall, Mich., a corporation of Michigan
Filed Apr. 24, 1963, Ser. No. 275,307
9 Claims. (Cl. 29—417)

This invention relates to a fluid pressure regulator and more specifically relates to a lever arm construction for a gas pressure regulator and to an improved method for producing same.

Gas pressure regulators of the type disclosed hereinbelow are produced in large quantities whereby a fractional cost reduction on a part of such a regulator can result in a total annual cost savings of thousands of dollars.

Currently known regulators generally include movable means for closing a gas inlet orifice and such means commonly comprise a pivoted lever which when correctly actuated place an end thereof over the orifice to seal same. Previous levers of this type have commonly included a resilient plug or insert for contacting and sealing the end of the orifice. Such resilient inserts are commonly separately manufactured, are commonly inserted into a drilled hole in the lever and are typically held therein by friction or by cementing. This type of construction is disadvantageous because of the multiplicity of separate manufacturing operations involved, said operations including the drilling of the hole in the lever, the preparation of the resilient insert, and the insertion of said insert into said hole as well as any further operations required for insuring that said insert remains in said hole. The above-described construction is further disadvantageous in that the resilient insert is not positively mechanically held in place in the lever arm and cannot be so positively mechanically held without adding further operations and expense to the already relatively expensive process. Thus, the possibility of service failures due to the displacement of the resilient insert from its hole in the lever arm is disadvantageously high.

Accordingly, the objects of this invention include:

(1) To provide an improved method of making a lever arm for a gas pressure regulator.

(2) To provide a method of making a lever arm, as aforesaid, having a positively mechanically retained resilient insert therein.

(3) To provide a method of making a lever arm, as aforesaid, wherein said resilient insert is bonded to the lever arm and contributes to the strength of the lever arm.

(4) To provide a method of making a lever arm, as aforesaid, which will be capable of economical manufacture in large quantities and which will require a minimum of separate operations to manufacture.

(5) To provide a method of making a lever arm construction, as aforesaid, which will be capable of extremely long, trouble-free, service life and which will require little or no maintenance to keep in perfect operating condition.

(6) To provide a method of making a lever arm construction, as aforesaid, which will be sufficiently cheaply manufactured that such a lever arm requiring maintenance while in use may be discarded and replaced with a minimum of cost.

(7) To provide a method for constructing a lever arm, as aforesaid, which requires a reduced number of manufacturing steps in the production of a plurality of such lever arm, which is especially adapted to production in large numbers and which minimizes the number of separate operations to be performed on an individual lever arm.

(8) To provide a method of construction, as aforesaid, which allows the construction of a lever arm and initial operations required thereby to be performed on a single elongated member from which a plurality of such lever arms may be separated each by a simple severing operation.

Other objects and purposes of the invention will be apparent to persons acquainted with apparatus of this general type upon reading the following disclosure and inspecting the accompanying drawings.

General description

Generally, the invention contemplates a lever arm for a gas pressure regulator having a transverse groove therethrough adjacent one end thereof. A resilient member, having contours complementary to those of said groove, lies within said groove for sealing a gas orifice upon appropriate actuation of said lever arm.

The method of the invention contemplates manufacturing a plurality of such lever arms from an elongated, constant cross-section piece of rigid material. Said elongated piece is advantageously extruded whereby the contours of the top, bottom and axial ends of said lever arm as well as said contour groove are formed therein by the extrusion operation. The method further contemplates the pouring of the resilient material, in liquid form, into said groove and allowing said resilient material to cure to a resilient state in said groove whereby said resilient material becomes bonded to said groove. The method still further contemplates the severing of a plurality of relatively narrow slices from said elongated piece to form a plurality of said lever arms.

Detailed description

The following description will utilize certain terminology for purposes of convenience in reference only and not as limiting. For example, the terms "upwardly" and "downwardly" will be used with reference to the position of the apparatus in FIGURE 1. The terms "rightwardly" and "leftwardly" will be used with reference to the drawings. The terms "forwardly" and "rearwardly" will be used with reference to the direction of the gas flow through the apparatus, the same being rightwardly in FIGURE 1. The terms "inwardly" and "outwardly" will refer to directions toward and away from the geometric center of the gas pressure regulator and of the lever arm. Such terminology will also include derivatives of the words above expressly mentioned and words of similar import.

Figure 1:
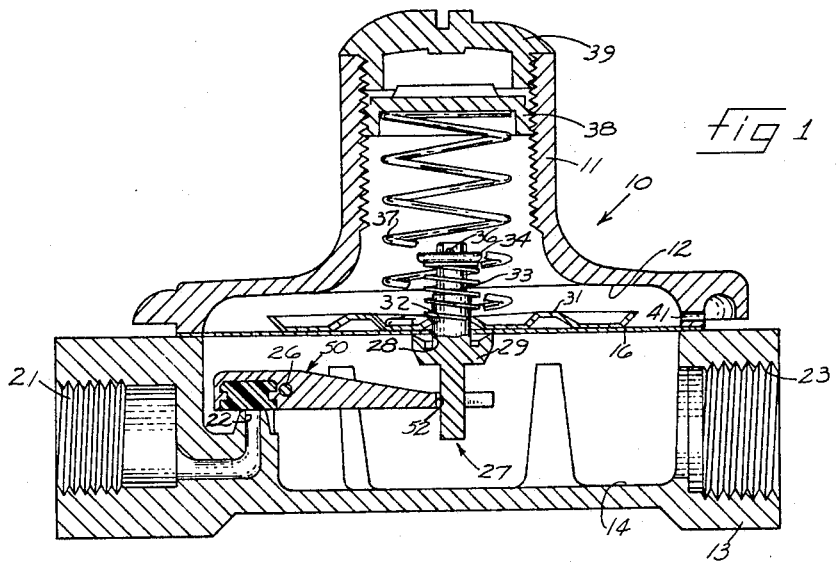
FIGURE 1 is a partially broken, central cross-sectional view of a gas pressure regulator including a lever arm embodying the invention.

FIGURE 1 discloses a gas pressure regulator 10 which is here shown to indicate a particular application of the lever arm construction embodying the invention. The regulator 10 includes an upper member or cover 11 defining an air chamber 12 and a lower member or body 13 defining a gas chamber 14. The cover 11 is joined to the body 13 by any convenient means such as screws not shown. An essentially continuous, flexible diaphragm 16 has its periphery disposed between the adjoining surfaces of the cover 11 and the body 13 whereby said periphery is held fixed with respect to the regulator 10. The diaphragm 16 thus seals the gas chamber 14 from the air chamber 12.

A gas inlet 21 communicates with the gas chamber 14 through an upwardly opening orifice 22 of relatively small diameter. The gas chamber 14 has an outlet opening 23 for communicating with means, not shown, to be fed with gas. A lever arm 50 embodying the invention is pivotally supported intermediate the ends thereof by any convenient means here shown for purposes of illustration as a pin 26 on an abutment 24 fixed to the body 13. Thus, a counter-clockwise rotation (FIGURE 1) of the lever arm 50 about its pivot pin 26 causes the leftward end of said arm to block the orifice 22 and an opposite rotation of said lever arm opens the orifice 22.

The opposite end (rightward as seen in FIGURE 1) of the lever arm 50 is vertically actuatable by the lower end of a support rod 27. The support rod 27 passes upwardly through a central opening 28 in the diaphragm 16 and has a circumferential flange 29 having an upturned peripheral edge normally in contact with the underside of the diaphragm 16 whereby to seal the central opening 28 from the gas chamber 14. A diaphragm retainer plate 31 rests on and is coaxially centered with respect to the diaphragm 16 and has a central opening 32 surrounding the upper end of the support rod 27. A spiral rod-positioning spring 33 is coaxial with the upper end of the support rod 27 and is disposed between the upper surface of the diaphragm retainer plate 31 and a spring retainer 34 which is retained on the upper end of the support rod 27 by a pin 36. Thus, the rod-positioning spring 33 biases the support rod 27 upwardly with respect to the diaphragm 16 whereby to urge the flange 29 into firm contact with the underside of the diaphragm 16 while the pressure within the gas chamber 14 is below a preselected, safe limit. A diaphragm bias spring 37 is coaxial with the support rod 27 and extends upwardly from the diaphragm retainer plate 31 to an adjustment cap 38 which is vertically adjustably disposed within the cover 11. The diaphragm bias spring 37 biases the diaphragm 16 downwardly and suitable vertical adjustment of the adjustment cap 38 so compresses the spring 37 that the diaphragm 16 will not move from its lowermost position until the desired magnitude of gas pressure is present in the gas chamber 14. A dust cap 39 seals the upper end of the air chamber 12. A small opening 41 is provided in the side wall of the cover 11 and maintains a constant pressure (preferably atmospheric pressure) on the upper side of the diaphragm 16.

Although the operation of the regulator unit has been indicated somewhat and although the above-discussed regulator with the exception of the lever arm 50 is of a type previously known in the art, the operation of said regulator will be given briefly immediately hereinbelow to provide a clear understanding of a particular environment in which the lever arm embodying the invention may be used. Briefly then, gas under pressure appearing at the orifice 22 will, assuming the pressure within the gas chamber 14 to be below a particular specified level, exert a force upon the lower face of the lever arm 50 adjacent thereto, which causes said lever arm to pivot about its pivot pin 26 in a clockwise direction whereby to allow communication between the orifice 22 and the gas chamber 14. As the gas in the orifice 22 fills the chamber 14, the pressure therein, assuming a non-free-flow condition from the outlet port 23 of said chamber, will eventually reach a preselectable pressure level which will cause an upwardly directed force to be exerted upon the underside of the diaphragm 16 whereby the central portion of said diaphragm rises against the bias exerted by the spring 37. The upward movement of the diaphragm 16 causes a corresponding movement of the support rod 27 due to the rod-positioning spring 33 which in turn causes an upward force to be exerted upon the rightward end of the lever arm 50. Because the surface area of the diaphragm 16 is very large in comparison to the cross-sectional area of the orifice 22 the upward force experienced by the diaphragm 16 will be greater than that experienced by the leftward end of the lever arm 50 despite the possible presence of a somewhat higher gas pressure within the inlet opening 21 than within the chamber 14. The mechanical advantage of the diaphragm 16 may be further multiplied as shown here by a disparity in torque-arm lengths incorporated in the lever arm 50 whereby the diaphragm 16 is connected to the longer of said torque arms. A decrease in the pressure in the chamber 14 due to the exit of gas therefrom through the outlet opening 23 reduces the pressure on the lower side of the diaphragm 16 to a point where gas pressure in the orifice 22 again becomes controlling and causes the lever arm 50 to pivot for opening said orifice. In a dynamic situation wherein gas flows continuously through the regulator 10, said regulator will operate in a continuous rather than in the step-by-step fashion hereinabove described whereby the pressure in the gas chamber 14 is maintained at a preselected level by the maintenance of the arm 50 in such a position as to partially close the orifice 22. A rise in pressure in the gas chamber 14 past the range of normal operation and to a predetermined maximum level due, for example, to a foreign particle preventing closure of the orifice 22 by the lever arm 50, forces the diaphragm 16 upwardly sufficiently to compress the spring 33 whereby the excess gas pressure is released past the flange 29, through the air chamber 12 and opening 41 and into the atmosphere.

Figure 2:
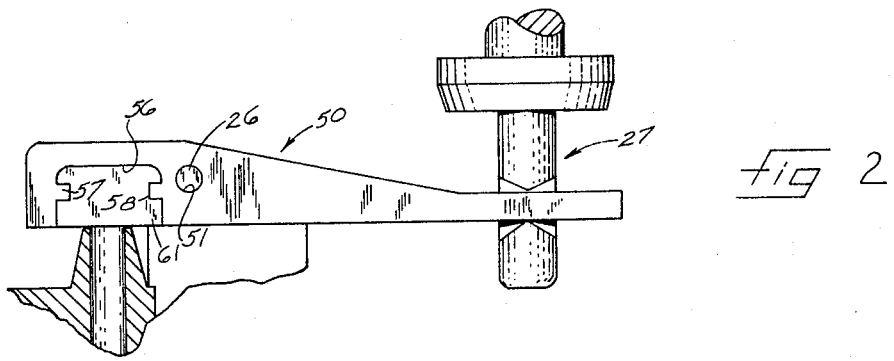
FIGURE 2 is a partially broken, fragmentary side elevational view of a portion of the apparatus disclosed in FIGURE 1.
Figure 3:
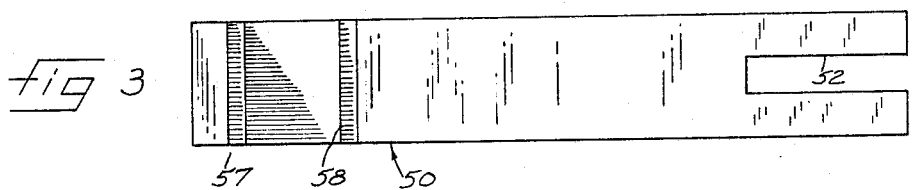
FIGURE 3 is a bottom view of a lever arm embodying the invention with the resilient insert deleted.
Figure 4:
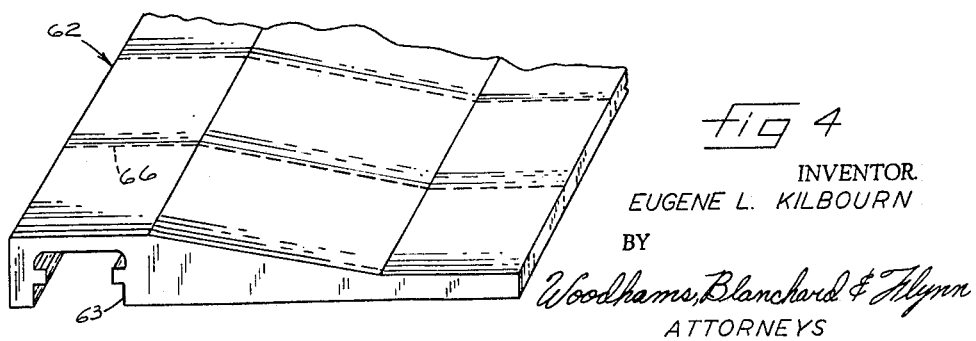
FIGURE 4 is a fragmentary oblique view of an elongated member from which may be severed a plurality of separate lever arms.

Turning now to the lever arm embodying the invention (FIGURES 2 and 3), a particular embodiment of such an arm will be disclosed which was developed for use with the pressure regulator 10 of FIGURE 1. However, the novel features of said arm are obviously incorporatable in arm constructions differing from the specific example described. The arm 50 is an elongated rigid piece having pivot means such as a bored hole 51 therein transverse to the longitudinal axis of said lever arm for rotatably receiving the heretofore-described pin 26. The pivot means exemplified by the hole 51 and pin 26 may be located, as here shown, closer to one end of the lever arm 50 than to the other end thereof whereby to functionally divide the lever arm 50 into a pair of unequal torque arms. Suitable connection means are included in one end of the lever arm 50 (rightward end as seen in FIGURES 2 and 3) for allowing actuation of said lever arm by the heretofore-described support rod 27. In this embodiment, said actuation means comprise an axially extending notch 52 opening through one end of the lever arm 50 and capable of receiving thereinto a portion of said support rod whereby radial extensions on said support rod, spaced above and below said lever arm, are capable of engaging said lever arm to rotate same about the pivot axis defined by the hole 51.

A downwardly opening groove 56 is incorporated in the leftward end of the lever arm 50 over the orifice 22 and extends preferably axially perpendicular to the longitudinal axis of the lever arm 50. The groove 56 is here shown as being of essentially rectangular cross section and having an opposed pair of parallel ridges 57 and 58 extending inwardly from the left and right side walls thereof respectively which ridges are aligned axially of said groove. A resilient insert 61, which may for purposes of illustration be considered neoprene, is received within the groove 56 and preferably continuously contacts the interior surface of the groove 56. The resilient insert 61 is preferably introduced into the notch 56 in a liquid state whereby upon hardening to a resilient state said insert becomes bonded to the interior surfaces of the groove 56. Thus, the resilient insert 61 is held within the notch 56 by the mechanical interlocking thereof with the ridges 57 and 58 as well as by the bonding thereof to the interior surface of the groove 56. The bonding of the insert 61 to the groove 56 integrates the two sufficiently that the insert 61 contributes to the strength of the arm 50 at its leftward end to reduce distortion of said arm due to forces applied thereto in normal operation.

The lever arm 50 with the insert 61 installed therein preferably has a planar bottom surface free of surface irregularities near the orifice 22 whereby to minimize turbulence and to insure quick reaction of a regulator employing the lever arm 50 to changes in pressure at the orifice 22.

The lever arm 50 is advantageously manufactured along with a plurality of additional, identical arms from an elongated piece 62 of rigid stock. The piece 62 is advantageously an aluminum extrusion having a top, bottom and left and right ends thereof of the shape required in corresponding surfaces of the finished lever arm 50. The piece 62 advantageously has an elongated groove 63 in the bottom face thereof, extending longitudinally thereof and having a cross section identical to that of the groove 56 in the finished arm 50. The extrusion 62 may be repositioned so that the groove 62 faces upwardly and a suitable normally resilient material, such as neoprene, may be poured in liquid form into the groove 63, the ends of which may be closed by any convenient means, not shown, to prevent spillage. The neoprene is then allowed to cure in place whereby to become bonded to the inner surface of the groove 63. Segments of the piece 62 may then be severed therefrom by any convenient means and preferably along parallel cutting planes perpendicular to the longitudinal axis of the piece 62, and indicated by the broken lines 66, to form the separate lever arms 50. The notches 52 (FIGURE 3) may then be cut in the rightward ends of the resulting lever arms to produce a plurality of finished lever arms such as the one shown in FIGURES 1 and 2. Alternatively, the notches 52 may be cut in the piece 62 while same is still in one piece by any convenient means whereby to minimize the number of articles upon which separate manufacturing operations must be performed. Similarly, the pivot hole 51, if same is required, may be drilled in the bar 62 while same is still in one piece, if desired. Thus, the manufacture of the lever arm 50 may be completed at the instant at which it is severed from the rest of the piece 62 and no further operations need be performed on the separate lever arms so formed. Obviously, this type of construction results in considerable saving in time and cost over methods involving numerous separate operations performed on each of a plurality of lever arms.

Although a particular embodiment of the invention has been disclosed above for illustrative purposes, it will be understood that variations or modifications of said disclosure, which lie within the scope of the appended claims, are fully contemplated.

What is claimed is:

1. A method of constructing a lever arm for a fluid pressure regulator comprising:

forming an elongated rigid member having a constant cross-sectional configuration and having an elongated, open groove longitudinally aligned with the longitudinal axis of said member;

orienting said elongated member so that said groove opens upwardly;

providing retention means at the ends of said groove for constituting with said groove a container capable of holding a liquid;

pouring a resilient material in liquid form into said groove and allowing same to harden to a resilient state;

removing said retention means from said elongated member; and severing successive, generally identical, segments from said member using cutting planes transverse to the longitudinal axis of said member, whereby each of said segments constitutes one of said lever arms.

2. The method defined in claim 1 wherein said elongated member is an extrusion.

3. The method defined in claim 1 wherein said resilient material is neoprene.

4. The method defined in claim 1 wherein said elongated member is an aluminum extrusion.

5. The method defined in claim 1 wherein said cutting planes are perpendicular to the longitudinal axis of said member.

6. The method defined in claim 1 wherein the cross-sectional configuration of the member is identical to the cross-sectional configuration of the finished lever arm.

7. The method defined in claim 1 including a hole located between the transverse ends of said member, running the length of said member, and having its central axis parallel to the longitudinal axis of said member.

8. The method defined in claim 1 including the cutting of the plurality of identical notches in one transverse end of said member, said notches being identically spaced longitudinally of said member, there being one such notch between each of said cutting planes and between the longitudinally outermost of said cutting planes and the longitudinal ends of said member.

9. The method defined in claim 1 wherein the hardening of said liquid into resilient state bonds said resilient material to the surface of said groove.

References Cited by the Examiner

UNITED STATES PATENTS

| | | | |
|---|---|---|---|
| 2,149,902 | 3/1939 | Saurer | 29—417 X |
| 2,544,209 | 3/1951 | Wolcott | 29—157.1 |
| 2,730,326 | 1/1956 | Staben | 251—358 |
| 2,761,202 | 9/1956 | Beare | 29—417 |
| 2,888,238 | 5/1959 | Leathers et al. | 251—358 |
| 3,168,776 | 2/1965 | Schwartfman | 29—157.1 |

FOREIGN PATENTS 601,424   5/1948   Great Britain.

JOHN F. CAMPBELL, *Primary Examiner.*

M. CARY NELSON, THOMAS H. EAGER, *Examiners.*

L. D. KAMPSCHROR, *Assistant Examiner.*